US011412141B2

(12) United States Patent
Kim et al.

(10) Patent No.: US 11,412,141 B2
(45) Date of Patent: Aug. 9, 2022

(54) OIS CIRCUIT, OIS DEVICE WITH SYNCHRONIZATION BETWEEN SINGLE SENSOR AND MULTIPLE DRIVERS, AND OPERATION METHOD THEREOF

(71) Applicant: Samsung Electro-Mechanics Co., Ltd., Suwon-si (KR)

(72) Inventors: Gyu Won Kim, Suwon-si (KR); Kyoung Joong Min, Suwon-si (KR); Jin Yong Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 197 days.

(21) Appl. No.: 16/932,893

(22) Filed: Jul. 20, 2020

(65) Prior Publication Data

US 2021/0321039 A1 Oct. 14, 2021

(30) Foreign Application Priority Data

Apr. 14, 2020 (KR) .................. 10-2020-0045219

(51) Int. Cl.
*H04N 5/232* (2006.01)
*G06F 13/42* (2006.01)

(52) U.S. Cl.
CPC ..... *H04N 5/23258* (2013.01); *G06F 13/4282* (2013.01); *H04N 5/2328* (2013.01)

(58) Field of Classification Search
CPC ............ H04N 5/23258; H04N 5/2328; H04N 5/23267; H04N 5/06; H04N 5/04; G06F 13/4282

See application file for complete search history.

(56) References Cited

U.S. PATENT DOCUMENTS

| 10,282,344 | B2 * | 5/2019 | Iyer ..................... G06F 13/4282 |
| 10,482,045 | B2 * | 11/2019 | Ahamed ................. G06F 13/32 |
| 2004/0183908 | A1 | 9/2004 | Tominaga et al. |
| 2017/0103036 | A1 * | 4/2017 | Iyer ..................... G06F 13/4295 |
| 2017/0235692 | A1 * | 8/2017 | Ahamed ............... G06F 1/3215 710/308 |
| 2021/0227140 | A1 * | 7/2021 | Ohishi .................. G03B 17/14 |

FOREIGN PATENT DOCUMENTS

| KR | 10-2004-0077546 A | 9/2004 |
| KR | 10-2018-0077500 A | 7/2018 |

* cited by examiner

*Primary Examiner* — Nicholas G Giles
(74) *Attorney, Agent, or Firm* — NSIP Law (57) ABSTRACT

An optical image stabilization (OIS) circuit, applied to an OIS device including a single sensor configured to provide sensor data is provided. The OIS circuit includes a main OIS circuit configured to output a control signal to the sensor, and receive the control signal from the sensor with sensor data, output an interruption signal to initiate a control operation, and control a main OIS operation, and a sub-OIS circuit configured to be synchronized with the main OIS circuit based on the control signal input with the sensor data, and control a sub OIS operation based on the interruption signal.

20 Claims, 7 Drawing Sheets

OIS CIRCUIT, OIS DEVICE WITH SYNCHRONIZATION BETWEEN SINGLE SENSOR AND MULTIPLE DRIVERS, AND OPERATION METHOD THEREOF

CROSS-REFERENCE TO RELATED APPLICATION(S)

This application claims the benefit under 35 USC 119(a) to Korean Patent Application No. 10-2020-0045219 filed on Apr. 14, 2020 in the Korean Intellectual Property Office, the entire disclosure of which is incorporated herein by reference for all purposes.

BACKGROUND

1. Field

The following description relates to an optical image stabilization (OIS) circuit and an OIS device with synchronization between a single sensor and multiple drivers and an operating method thereof.

2. Description of Related Art

A camera module may typically include an OIS circuit, and the OIS circuit may detect camera shake information and move a lens or an image sensor in a direction opposite to the detected camera shake direction, such that a clear image can be obtained, without the detrimental effects of the camera shake.

An existing OIS circuit may use sensor data received from a gyro sensor to stabilize operations of the camera module.

The OIS circuit may implement a serial peripheral interface (SPI) bus/inter-integrated circuit (I2C) to receive the sensor data from the gyro sensor.

Further, the typical OIS circuit is configured with a single driver IC connected to a single gyro sensor. In the example of a system that implements a plurality of gyro sensors, a plurality of driver ICs may be connected to a plurality of the gyro sensor on a one-to-one basis.

In an example where two OIS circuits are applied to two camera modules, two gyro sensors may be necessary.

Recently, as it becomes desirous for electronic devices to be multifunctionalized, and to achieve high performance, a larger number of camera modules may be built in electronic devices, such as vehicles, smartphones, or the like.

As previously described, when several camera modules are built in an electronic device, use of several gyro sensors increases manufacturing costs, which may be problematic.

To solve such a problem, use of a single gyro sensor, instead of implementing several gyro sensors, may be considered. However, use of a single gyro sensor may create problems related to sensor data and OIS control operation synchronization may arise among a plurality of the OIS circuits connected to the single gyro sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical image stabilization (OIS) circuit including a single sensor configured to provide sensor data, the OIS circuit includes a main OIS circuit configured to output a control signal to the sensor, and receive the control signal from the sensor with sensor data, output an interruption signal to initiate a control operation, and control a main OIS operation; and a sub-OIS circuit configured to be synchronized with the main OIS circuit based on the control signal input with the sensor data, and control a sub OIS operation based on the interruption signal.

The main OIS circuit includes a serial peripheral interface (SPI) master configured to perform an SPI communication with an SPI slave in the sensor; and a memory configured to store sensor data received through the SPI communication.

The main OIS circuit may further include a timer configured to produce the interruption signal.

The control signal of the main OIS circuit may further include a clock signal and a chip selector signal.

The sub OIS circuit may further include first to $N^{th}$ sub OIS circuits, and the first to $N^{th}$ sub OIS circuits may be enabled based on the chip selector signal, and may be configured to receive the sensor data from the sensor based on the clock signal.

In a general aspect, an optical image stabilization (OIS) device includes a single sensor configured to provide sensor data; a main OIS circuit configured to: output a control signal to the single sensor, and receive the control signal with sensor data, output an interruption signal to initiate a control operation, and control a main OIS operation; and a sub-OIS circuit configured to be synchronized with the main OIS circuit based on the control signal input with the sensor data, and control a sub OIS operation based on the interruption signal.

The main OIS circuit may include a serial peripheral interface (SPI) master configured to perform an SPI communication with an SPI slave in the single sensor; and a memory configured to store sensor data received through the SPI communication.

The single sensor may include a gyro sensor comprising an SPI slave configured to perform an SPI communication with the main OIS circuit.

The main OIS circuit may further include a timer configured to produce the interruption signal.

The control signal of the main OIS circuit may include a clock signal and a chip selector signal.

The sub OIS circuit may include first to $N^{th}$ sub OIS circuits, and the first to $N^{th}$ sub OIS circuits are enabled based on the chip selector signal, and are configured to receive the sensor data from the single sensor based on the clock signal.

In a general aspect, an operating method of an optical image stabilization (OIS) device includes outputting a control signal from a main OIS circuit to a single sensor, and receiving the control signal with sensor data output from the single sensor; inputting the sensor data output from the single sensor to a sub OIS circuit based on the control signal; cyclically producing, by the main OIS circuit, an interruption signal to initiate a control operation to control a main OIS operation based on the interruption signal; and controlling, by the sub OIS circuit, a sub OIS operation based on the interruption signal.

A serial peripheral interface (SPI) SPI slave in the single sensor may perform an SPI communication with the main OIS circuit.

A timer in the main OIS circuit may produce the interruption signal to initiate the control operation.

The control signal of the main OIS circuit may include a clock signal and a chip selector signal.

The sub OIS circuit may include first to $N^{th}$ OIS circuits, and the first to $N^{th}$ OIS circuits are enabled based on the chip selector signal, and receive the sensor data output from the single sensor based on the clock signal.

In a general aspect, an optical image stabilization (OIS) device includes an OIS circuit comprising a main OIS circuit, and one or more sub OIS circuits; and a single sensor configured to receive a control signal from the main OIS circuit, and transmit the control signal and sensor data to the main OIS circuit and the one or more sub OIS circuits; wherein the main OIS circuit comprises a timer configured to generate an interruption signal, and wherein the one or more sub OIS circuits are synchronized with the main OIS circuit to simultaneously receive the sensor data in response to the control signal, and to perform a sub OIS control operation based on the interruption signal.

The timer of the main OIS circuit may be configured to produce the interruption signal to initiate the OIS control operation.

The OIS control operation may include an operation to control a lens actuator.

The single sensor may be a gyro sensor.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

As used herein, the term "and/or" includes any one and any combination of any two or more of the associated listed items.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Figure 1:
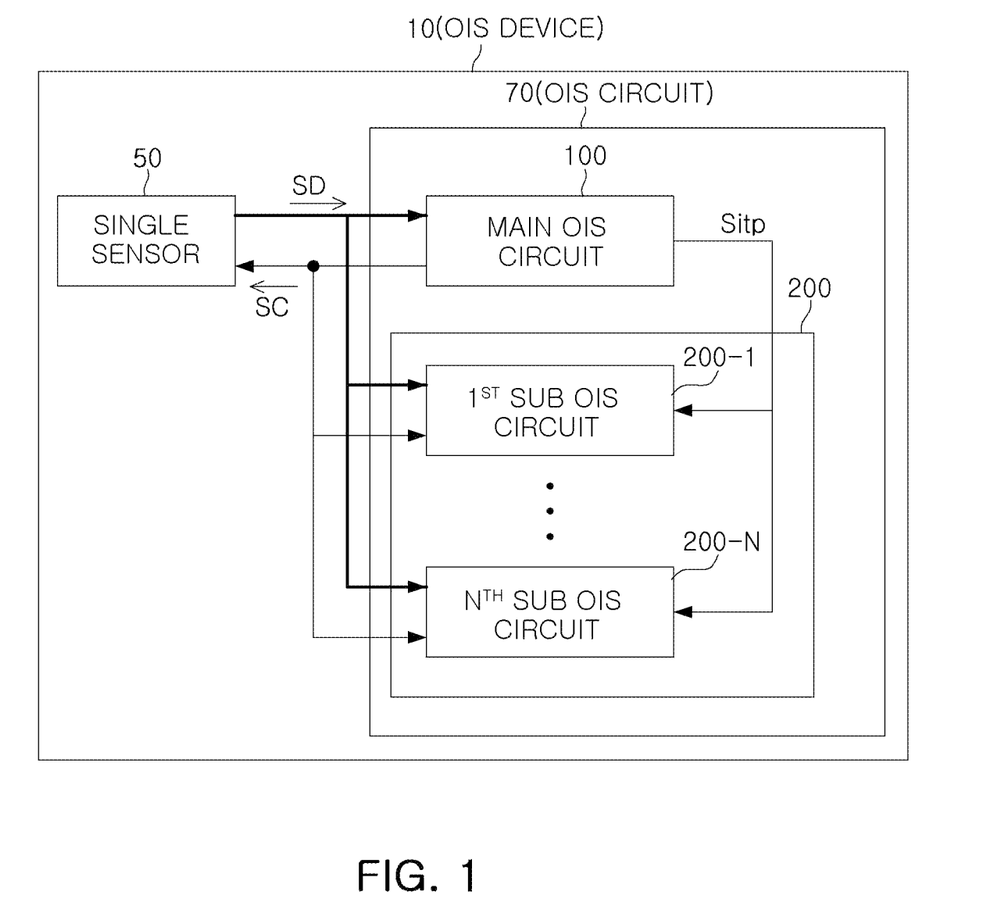
FIG. 1 is a block diagram schematically illustrating an example configuration of an OIS device, in accordance with one or more embodiments.

FIG. 1 is a block diagram schematically illustrating a configuration of an example OIS device, in accordance with one or more embodiments.

Referring to FIG. 1, an OIS device 10, in accordance with one or more embodiments, may include a single sensor 50 and an OIS circuit 70.

The single sensor 50 may provide sensor data SD. The single sensor 50 may be, as a non-limited example, an angular velocity sensor and may be, as a non-limiting example, a gyro sensor.

Figure 2:
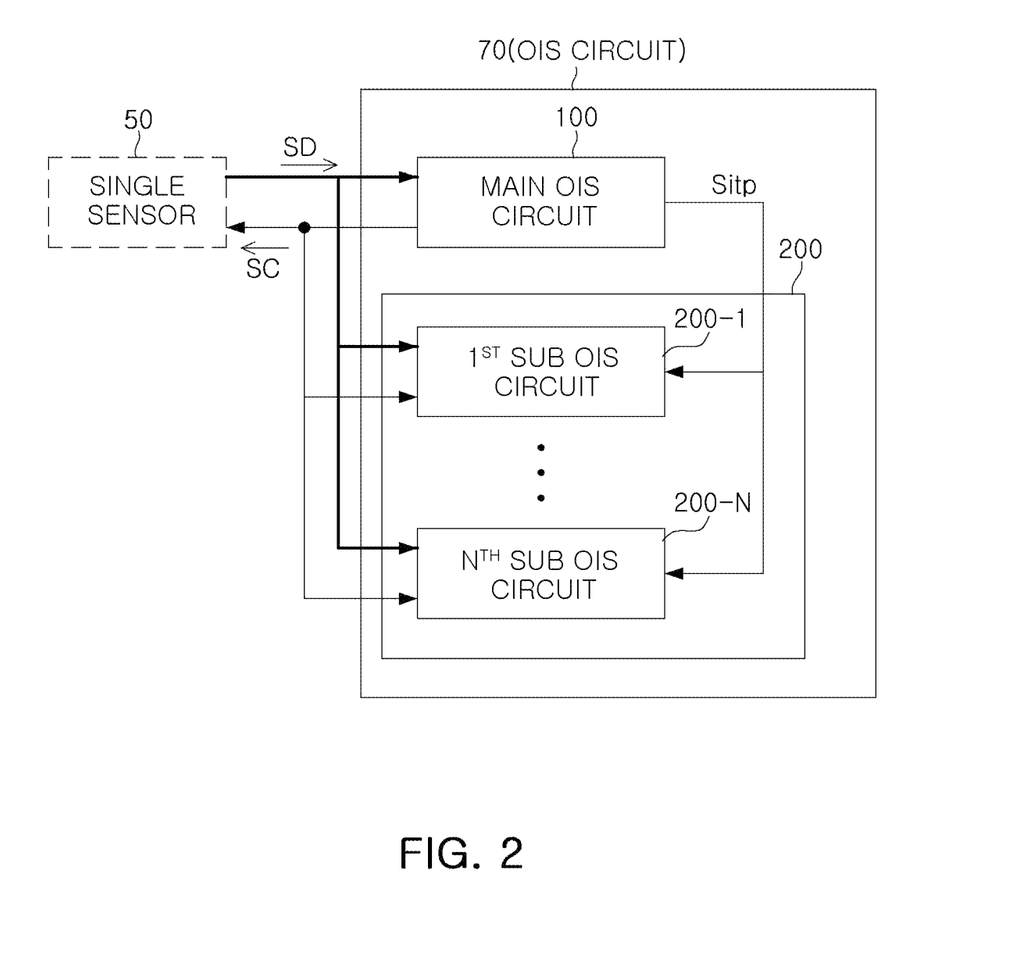
FIG. 2 is a block diagram schematically illustrating an example configuration of an OIS circuit, in accordance with one or more embodiments.

FIG. 2 is a block diagram schematically illustrating an example configuration of an OIS circuit, in accordance with one or more embodiments Referring to FIGS. 1 and 2, the OIS circuit 70 may include a main OIS circuit 100 and a sub OIS circuit 200.

The main OIS circuit 100 may be configured to output a control signal SC to be input with sensor data SD, output an interruption signal Sitp to initiate a control operation, and control a main OIS operation. Specifically, the main OIS circuit 100 may generate the control signal SC, and transmit the generated control signal SC to the single sensor 50. The control signal SC may then be transmitted to the OIS circuit and the sub OIS circuit 200 with the sensor data SD.

The sub OIS circuit 200 may be configured to be synchronized with the main OIS circuit 100 in response to the control signal SC, to be input with the sensor data SD output from the single sensor 50, and control the sub OIS operation based on the interruption signal Sitp. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In an example, the sub OIS circuit 200 may include first to $N^{th}$ sub OIS circuits 200-1 to 200-N. The first to $N^{th}$ sub OIS circuits 200-1 to 200-N may be synchronized with the main OIS circuit 100 in response to the control signal SC. The control signal SC may be input with the sensor data SD that is output from the single sensor 50 to perform a sub OIS control operation corresponding to the interruption signal Sitp.

In the drawings, repeated descriptions of the same components and functions will be omitted, and only differences therebetween may be described.

Figure 3:
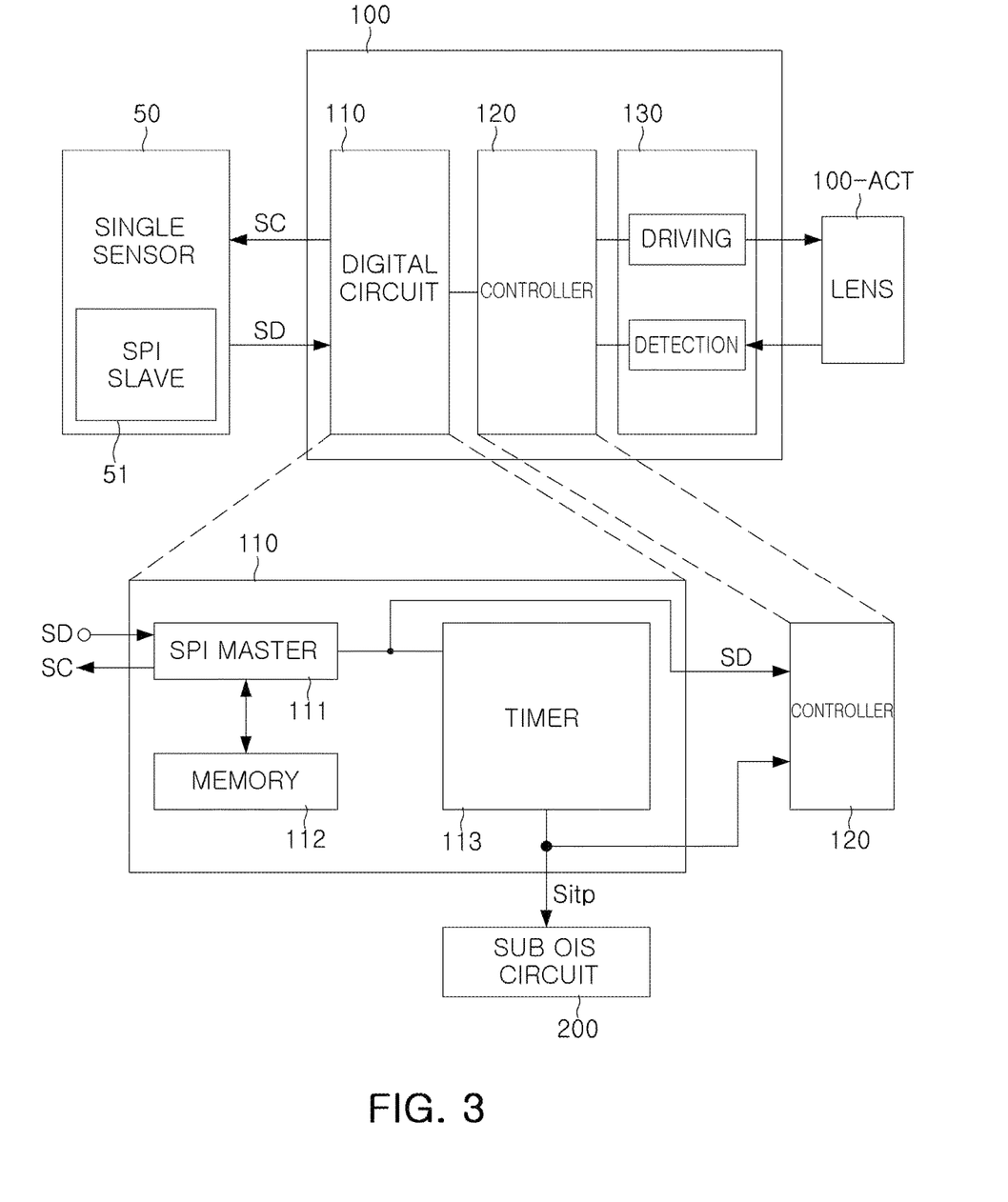
FIG. 3 is a block diagram schematically illustrating an example configuration of a main OIS circuit of FIG. 1.

FIG. 3 is a block diagram schematically illustrating a configuration of an example main OIS circuit of FIG. 1.

Referring to FIG. 3, the main OIS circuit 100 may include a digital circuit 110, a controller 120 and a driving and detecting circuit 130.

The digital circuit 110 may receive the sensor data SD output from the single sensor 50, and provide the received sensor data SD to the controller 120.

The controller 120 may control an OIS operation and driving of a lens actuator 100-ACT based on a detection signal, and the sensor data SD.

The driving and detecting circuit 130 may drive the lens actuator 100-ACT based on the control of the controller 120, and provide the detection signal for a position of the lens actuator 100-ACT to the controller 120.

In an example, the digital circuit 110 may include a serial peripheral interface (SPI) master 111, a memory 112 and a timer 113.

The SPI master 111 performs an SPI communication with an SPI slave 51 included in the single sensor 50, and provides a control signal SC to the single sensor 50, and receives sensor data from the single sensor 50.

The memory 112 may store the sensor data SD received from the single sensor 50 through the SPI communication performed in the SPI master 111.

To implement the synchronization of the OIS control operation, the timer 113 may produce the interruption signal Sitp, and output the interruption signal Sitp to the controller 120 of the main OIS circuit 100, and the sub OIS circuit 200.

Figure 4:
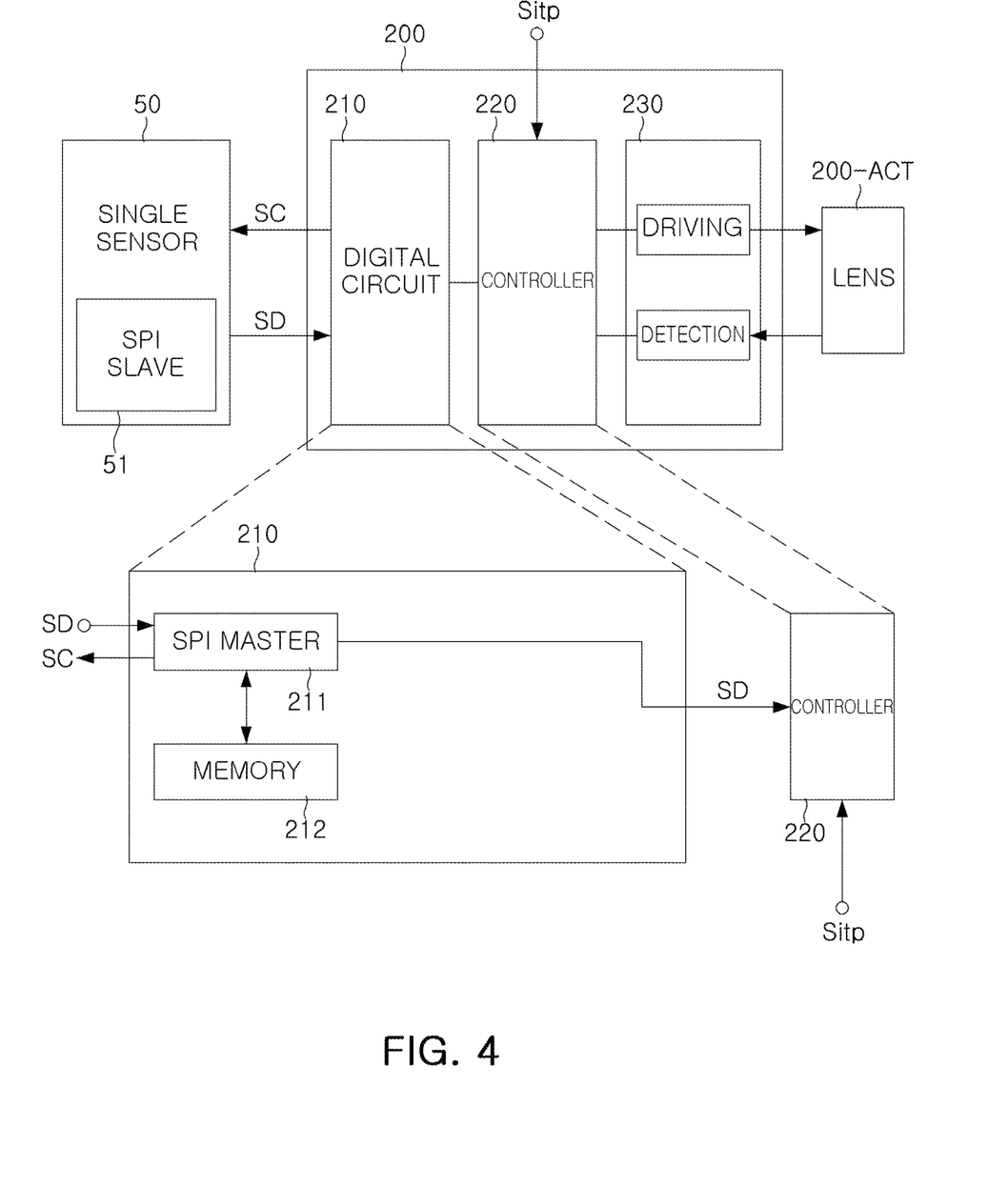
FIG. 4 is a block diagram schematically illustrating an example configuration of a sub OIS circuit of FIG. 1.

FIG. 4 illustrates a configuration of an example sub OIS circuit of FIG. 1.

Referring to FIG. 4, as previously described, the sub OIS circuit 200 may include first to $N^{th}$ sub OIS circuits 200-1 to 200-N.

Each of the first to $N^{th}$ sub OIS circuits 200-1 to 200-N may include a digital circuit 210, a controller 220 and a driving and detecting circuit 230.

The digital circuit 210 may receive sensor data SD from the single sensor 50, and provide the received sensor data SD to the controller 220.

The controller 220 may control an OIS operation and driving of a lens actuator 200-ACT based on a detection signal and the sensor data SD.

The driving and detecting circuit 230 may drive the lens actuator 200-ACT based on the control of the controller 220, and provide the detection signal for a position of the lens actuator 200-ACT to the controller 220.

In an example, the digital circuit 210 may include a serial peripheral interface (SPI) slave 211 and a memory 112.

When the SPI master 111 reads sensor data SD, the SPI slave 211, in connection with the SPI master 111 of the main OIS circuit 100 and the SPI slave 51 included in the single sensor 50, is synchronized therewith and captures the sensor data SD.

The memory 212 may store the sensor data SD captured in the SPI slave 211.

Figure 5:
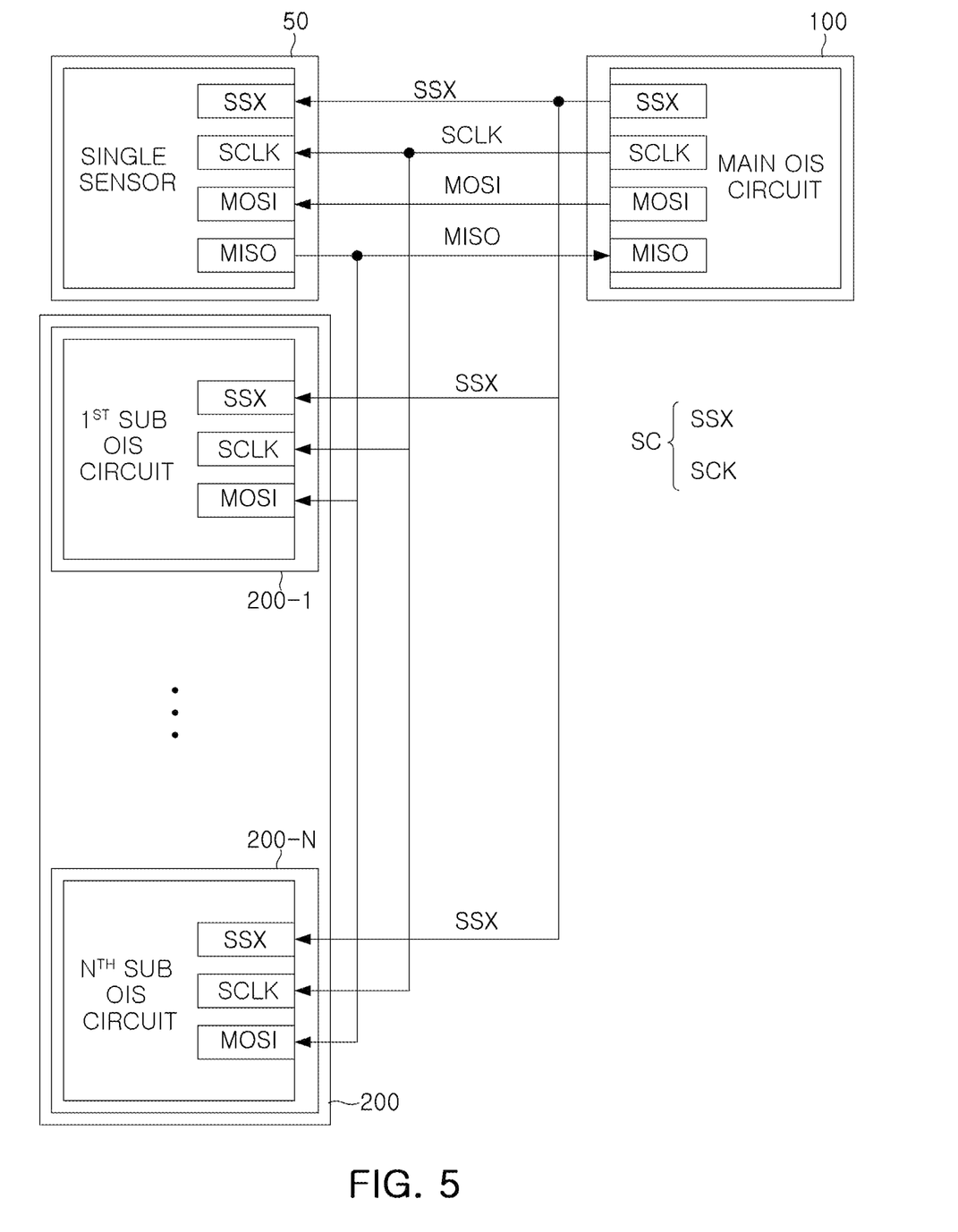
FIG. 5 illustrates an example of sensor data synchronization in the OIS device of FIG. 1.

FIG. 5 illustrates sensor data synchronization in the example OIS device of FIG. 1.

Referring to FIG. 5, the main OIS circuit 100 may be connected to the single sensor 50 via a chip selector signal (SSX) terminal, a clock signal (SCLK) terminal, a master output slave input (MOSI) terminal, and a master input slave output (MISO) terminal.

The main OIS circuit 100 may also be connected to the first to $N^{th}$ sub OIS circuits 200-1 to 200-N via the chip selector signal (SSX) terminal, the clock signal (SCLK) terminal, and the master input slave output (MISO) terminal of the SPI master 110 of the main OIS circuit 100 may be connected to the master output slave input (MOSI) terminal of the first to $N^{th}$ sub OIS circuits 200-1 to 200-N.

Accordingly, the main OIS circuit 100 may provide the chip selector signal SSX and the clock signal SCLK included in the control signal SC to the single sensor 50 to receive the sensor data SD.

The single sensor 50 may operate in accordance with the chip selector signal SSX and the clock signal SCLK to provide sensor data SD through the master input slave output (MISO) terminal.

The main OIS circuit 100 may receive the sensor data SD through the master input slave output (MISO) terminal.

During the process, the first to $N^{th}$ sub OIS circuits 200-1 to 200-N may be synchronized with the single sensor 50 in accordance with the chip selector signal SSX and the clock signal SCLK to operate, and may be synchronized with the main OIS circuit 100 to capture (receive) the sensor data SD through the master output slave input (MOSI) terminal.

In an example, the first to $N^{th}$ sub OIS circuits 200-1 to 200-N may be enabled based on the chip selector signal SSX which is input with the sensor data SD output from the single sensor 50 based on the clock signal SCLK.

Additionally, in an OIS device including a single main OIS circuit 100, a single sensor 50, and a plurality of sub OIS circuits 200-1 to 200-N, the main OIS circuit 100 reads the received sensor data SD, and while the main OIS circuit 100 is communicating, a plurality of the sub OIS circuits 200-1 to 200-N may capture or receive the sensor data SD on a data line without being involved in the communication of the main OIS circuit 100.

According to such an operation, sub-driver ICs do not interrupt or become involved in the communication of the main driver IC and the sensor, and the main OIS circuit 100 may simultaneously share the sensor data with a plurality of the sub OIS circuits.

Figure 6:
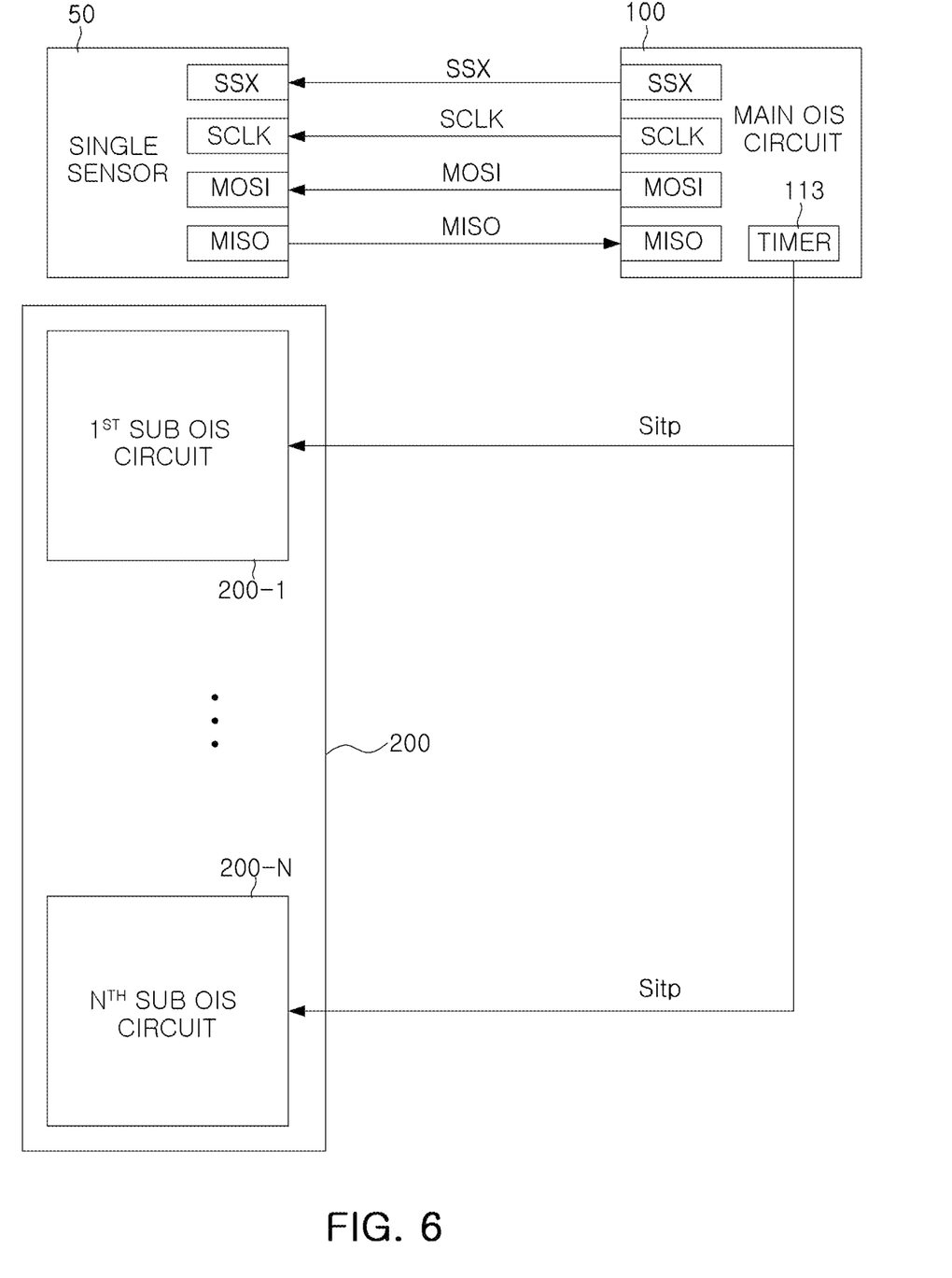
FIG. 6 illustrates an example OIS control operation synchronization in the OIS device of FIG. 1.

FIG. 6 illustrates OIS control operation synchronization in the OIS device of FIG. 1.

Referring to FIG. 6, the main OIS circuit 100 may be connected to the single sensor 50 via a chip selector signal (SSX) terminal, a clock signal (SCLK) terminal, a master output slave input (MOSI) terminal and a master input slave output (MISO) terminal.

The timer 113 of the main OIS circuit 100 is connected to the first to $N^{th}$ sub OIS circuits 200-1 to 200-N, and may cyclically generate an interruption signal Sitp, and provide the generated interruption signal Sitp to the first to $N^{th}$ sub OIS circuits 200-1 to 200-N.

Accordingly, the main OIS circuit 100 may control the main OIS based on the cyclically produced interruption signal Sitp, and the first to $N^{th}$ sub OIS circuits 200-1 to 200-N may be synchronized with the main OIS circuit 100 to perform a corresponding sub OIS control operation based on the interruption signal Sitp.

Additionally, the main OIS circuit 100 may include the timer 113 which cyclically produces the interruption signal Sitp, while the sub OIS circuits may not include a timer. The main OIS circuit 100 may synchronize the OIS control operation in response to the interruption signal by sharing the single timer with the sub OIS circuits 200-1 to 200-N.

In an example, a plurality of the sub OIS circuits may wait for the interruption signal passively input from the main OIS circuit, and perform a corresponding OIS control operation once the interruption signal is received.

Through such processes, the sub OIS circuits, in contrast to the main OIS circuit, may not include a timer, and thus may have reduced current or power consumption.

Figure 7:
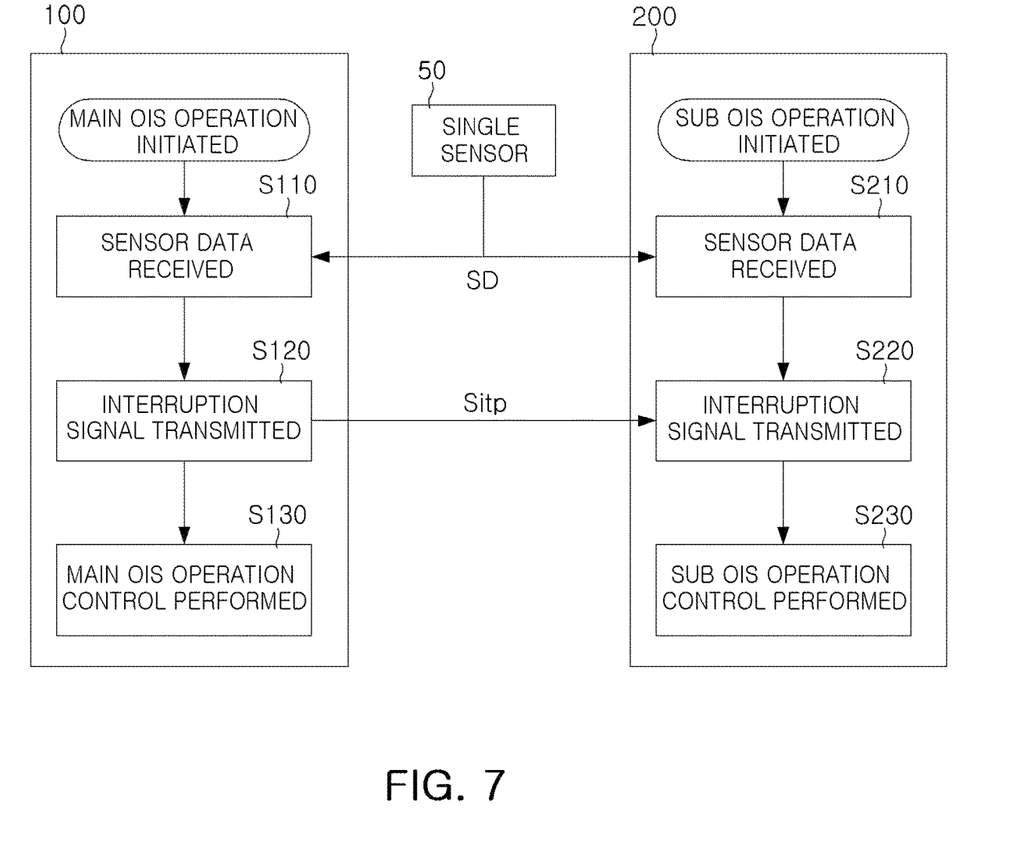
FIG. 7 is a flowchart illustrating an operating method of an OIS device, in accordance with one or more embodiments.

FIG. 7 is a flowchart illustrating an operating method of an example OIS device, in accordance with one or more embodiments.

With respect to the operating method of an OIS device, in accordance with one or more embodiments, the same operations as those described with reference to FIGS. 1 to 6 may be applied. Accordingly, detailed explanations, which are repeated, may be omitted.

Referring to FIG. 7, and with reference to FIGS. 1-6, in operation S110, a main OIS device 100 outputs a control signal SC to be input with sensor data SD output from a single sensor 50.

As an example, an SPI slave 51 included in the single sensor 50 may perform an SPI communication with the main OIS circuit 100.

In operation S210, sub OIS circuits 200 may also receive the sensor data SD output from the single sensor 50 based on the control signal SC.

In operation S120, the main OIS circuit 100 cyclically produces an interruption signal Sitp to initiate a control operation to control a main OIS operation based on the interruption signal Sitp.

In an example, the timer 113 included in the main OIS circuit 100 may produce the interruption signal Sitp to initiate the control operation.

In operation S220, the sub OIS circuits 200 controls a sub OIS operation based on the received interruption signal Sitp.

In operation S130, the main OIS circuit 100 may control the main OIS operation, while the sub OIS circuits 200 may control the corresponding sub OIS operation in operation S230.

Additionally, by sharing the sensor data output from a single sensor 50 between the main OIS circuit and the sub OIS circuits, a more effective operation may be enabled. A timer producing an interruption signal may be included in the main OIS circuit. As disclosed above, a single timer is used to inform the sub OIS circuits of a calibration time point for the OIS control operation. Accordingly, the main OIS circuit and the sub OIS circuits may be synchronized.

Additionally, the main OIS circuit may determine an SPI operation speed and a time for cyclic reading, thereby reading sensor data from the single sensor through a 3-wire or 4-wire communication based on the determined time. Accordingly, read sensor data may be stored in a memory, and then used to prepare a corresponding OIS control operation.

For the OIS control operation, a control cycle may be determined, which is determined by an internal timer and lead to cyclic production of interruption signals.

When the interruption signal is produced, the main OIS circuit may initiate a main OIS control operation, and use a corresponding lens actuator to move a lens. The sub OIS circuits which receive the interruption signal from the main OIS circuit, may be simultaneously synchronized with the main OIS circuit based on the interruption signal, and may perform a corresponding OIS control operation. By performing the control operation, a plurality of the OIS circuits may be synchronized.

In an example of a basic OIS device in which a plurality of OIS circuits independently include an oscillator, oscillator frequencies thereof cannot be identical to each other, which may be problematic. It may also be problematic that it may not be possible to verify a timing at which power is applied, and a timing at which a circuit operates.

As previously described, in the example embodiments, an interface between the main OIS circuit and the sub OIS circuits may be effectively configured such that functions of typical OIS devices are provided, and an effective implementation of a camera module may be feasible with regard to a miniaturized size and lower costs by sharing and using sensor data.

Typical camera modules have a structure in which a sensor and an OIS circuit are connected on a one-to-one basis, and thus has complexity is increased. The OIS device of the example embodiments, however, may resolve the problems with regard to size and costs.

Additionally, in the example embodiments, technical problems that occur when use of multi-OIS drive ICs increases due to an increase in the number of camera modules, and when a single piece of gyro data is desired to be shared may be addressed, and synchronization of gyro data and an update cycle for the OIS control may be resolved.

Further, several OIS circuits may be effectively utilized. Use of one single sensor to share sensor data is advantageous in that a number of components used to form a camera module may be reduced, and this may be economically advantageous. Use of a reduced number of components may be related to a size of the camera module, and thus is advantageous with regard to space utilization.

In an example, controllers 120 and 220, in accordance with one or more embodiments may be implemented as a computing environment in which a processor (e.g., a central processing unit (CPU), a graphic processing unit (GPU), a microprocessor, an application specific integrated circuit (ASIC), a field programmable gate arrays (FPGA), or the like), a memory (e.g., a voltage memory (e.g., RAM, or the like), non-volatile memory (e.g., ROM, a flash memory, or the like), an input device (e.g., a keyboard, a mouse, a pen, a voice input device, a touch input device, an infrared camera, a video input device, or the like), an output device (e.g., a display, a speaker, a printer, or the like) and a communication connection device (e.g., a modem, a network interface card (NIC), an integrated network interface, a wireless frequency transmitter/receiver, an infrared port, a USB connection, or the like) are mutually connected (e.g., peripheral component interconnection, USB, firmware (IEEE 1394), an optical bus structure, a network, or the like).

The computing environment may be implemented as a personal computer, a server computer, a handheld or laptop device, a mobile device (a mobile phone, a personal digital assistants (PDA), a media player, or the like), a multiprocessor system, a consumer electronic device, a mini computer, a mainframe computer, a distributed computing environment including any system or device described above, or the like, but is not limited thereto.

According to each exemplary embodiment, in a plurality of OIS circuits, sensor data and an OIS control operation can be synchronized between the OIS circuits. Accordingly, the OIS control operation of a camera module can be more stably performed, and more stable control of an actuator is feasible.

Further, in accordance with one or more embodiments, in a plurality of OIS circuits, sensor data and an OIS control operation may be synchronized between the OIS circuits by sharing the sensor data between the OIS circuits.

In accordance with one or more embodiments, in an OIS device including a plurality of OIS circuits, the implementation of one single sensor, to which a plurality of the OIS circuits are commonly connected, may simplify a component configuration and thus reduce costs. Additionally, the implementation of single sensor is advantageous in minimizing space utilization when built in a camera module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical image stabilization (OIS) circuit comprising a single sensor configured to provide sensor data, the OIS circuit comprising:
   a main OIS circuit configured to:
      output a control signal to the sensor, and receive the control signal from the sensor with sensor data,
      output an interruption signal to initiate a control operation, and
      control a main OIS operation; and
   a sub-OIS circuit configured to be synchronized with the main OIS circuit based on the control signal input with the sensor data, and control a sub OIS operation based on the interruption signal.

2. The OIS circuit of claim 1, wherein the main OIS circuit comprises:
   a serial peripheral interface (SPI) master configured to perform an SPI communication with an SPI slave in the sensor; and
   a memory configured to store sensor data received through the SPI communication.

3. The OIS circuit of claim 2, wherein the main OIS circuit further comprises a timer configured to produce the interruption signal.

4. The OIS circuit of claim 2, wherein the control signal of the main OIS circuit comprises a clock signal and a chip selector signal.

5. The OIS circuit of claim 4, wherein the sub OIS circuit comprises first to $N^{th}$ sub OIS circuits, and
   wherein the first to $N^{th}$ sub OIS circuits are enabled based on the chip selector signal, and are configured to receive the sensor data from the sensor based on the clock signal.

6. An optical image stabilization (OIS) device, comprising:
   a single sensor configured to provide sensor data;
   a main OIS circuit configured to:
      output a control signal to the single sensor, and receive the control signal with sensor data,
      output an interruption signal to initiate a control operation, and
      control a main OIS operation; and
   a sub-OIS circuit configured to be synchronized with the main OIS circuit based on the control signal input with the sensor data, and control a sub OIS operation based on the interruption signal.

7. The OIS device of claim 6, wherein the main OIS circuit comprises:
   a serial peripheral interface (SPI) master configured to perform an SPI communication with an SPI slave in the single sensor; and
   a memory configured to store sensor data received through the SPI communication.

8. The OIS device of claim 6, wherein the single sensor comprises a gyro sensor comprising an SPI slave configured to perform an SPI communication with the main OIS circuit.

9. The OIS device of claim 7, wherein the main OIS circuit further comprises a timer configured to produce the interruption signal.

10. The OIS device of claim 7, wherein the control signal of the main OIS circuit comprises a clock signal and a chip selector signal.

11. The OIS device of claim 10, wherein the sub OIS circuit comprises first to $N^{th}$ sub OIS circuits, and
   wherein the first to $N^{th}$ sub OIS circuits are enabled based on the chip selector signal, and are configured to receive the sensor data from the single sensor based on the clock signal.

12. An operating method of an optical image stabilization (OIS) device, the method comprising:
   outputting a control signal from a main OIS circuit to a single sensor, and receiving the control signal with sensor data output from the single sensor;

inputting the sensor data output from the single sensor to a sub OIS circuit based on the control signal;

cyclically producing, by the main OIS circuit, an interruption signal to initiate a control operation to control a main OIS operation based on the interruption signal; and controlling, by the sub OIS circuit, a sub OIS operation based on the interruption signal.

13. The operating method of claim 12, wherein a serial peripheral interface (SPI) SPI slave in the single sensor performs an SPI communication with the main OIS circuit.

14. The operating method of claim 12, wherein a timer in the main OIS circuit produces the interruption signal to initiate the control operation.

15. The operating method of claim 12, wherein the control signal of the main OIS circuit comprises a clock signal and a chip selector signal.

16. The operating method of claim 15, wherein the sub OIS circuit comprises first to $N^{th}$ OIS circuits, and
wherein the first to $N^{th}$ OIS circuits are enabled based on the chip selector signal, and receive the sensor data output from the single sensor based on the clock signal.

17. An optical image stabilization (OIS) device comprising:
an OIS circuit comprising a main OIS circuit, and one or more sub OIS circuits; and
a single sensor configured to receive a control signal from the main OIS circuit, and transmit the control signal and sensor data to the main OIS circuit and the one or more sub OIS circuits;
wherein the main OIS circuit comprises a timer configured to generate an interruption signal, and
wherein the one or more sub OIS circuits are synchronized with the main OIS circuit to simultaneously receive the sensor data in response to the control signal, and to perform a sub OIS control operation based on the interruption signal.

18. The OIS device of claim 17, wherein the timer of the main OIS circuit is configured to produce the interruption signal to initiate the OIS control operation.

19. The OIS device of claim 18, wherein the OIS control operation comprises an operation to control a lens actuator.

20. The OIS device of claim 19, wherein the single sensor is a gyro sensor.

* * * * *